United States Patent
Salman et al.

(10) Patent No.: US 8,055,424 B2
(45) Date of Patent: Nov. 8, 2011

(54) REAL-TIME IDENTIFICATION OF MAXIMUM TIRE-ROAD FRICTION COEFFICIENT BY INDUCED WHEELS ACCELERATION/DECELERATION

(75) Inventors: Mutasim A. Salman, Rochester Hills, MI (US); William C. Lin, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 12/276,031

(22) Filed: Nov. 21, 2008

(65) Prior Publication Data

US 2010/0131165 A1  May 27, 2010

(51) Int. Cl.
    *G06F 19/00* (2006.01)
(52) U.S. Cl. ................................ 701/80; 303/150
(58) Field of Classification Search .................. None
    See application file for complete search history.

(56) References Cited

U.S. PATENT DOCUMENTS

| | | | |
|---|---|---|---|
| 6,023,649 A * | 2/2000 | Matsuura et al. | 701/71 |
| 2003/0078717 A1 * | 4/2003 | Kawasaki et al. | 701/80 |
| 2005/0102086 A1 * | 5/2005 | Nakao | 701/80 |
| 2007/0061061 A1 | 3/2007 | Salman et al. | |

* cited by examiner

*Primary Examiner* — Michael J. Zanelli
(74) *Attorney, Agent, or Firm* — John A. Miller; Miller IP Group, PLC

(57) ABSTRACT

A method for estimating the maximum tire/road surface coefficient of friction for a vehicle that includes actively inducing a small amount of acceleration or deceleration to the front wheels or the rear wheels of the vehicle and inducing a corresponding and opposite amount of acceleration or deceleration to the other of the front wheels or the rear wheels of the vehicle so that the acceleration and deceleration cancel each other and the perceived speed of the vehicle does not change. The tire/road surface coefficient of friction and a wheel-slip ratio can be used to determine a road surface condition.

20 Claims, 5 Drawing Sheets

REAL-TIME IDENTIFICATION OF MAXIMUM TIRE-ROAD FRICTION COEFFICIENT BY INDUCED WHEELS ACCELERATION/DECELERATION

BACKGROUND OF THE INVENTION

1. Field of the Invention

This invention relates generally to a method for estimating the maximum tire/road surface coefficient of friction for a vehicle and, more particularly, to a method for estimating the maximum tire/road surface coefficient of friction for a vehicle that includes inducing an acceleration in the front wheels or the real wheels of the vehicle and inducing a deceleration in the other of the front wheels or the rear wheels of the vehicle so that the acceleration and deceleration cancel and the perceived speed of the vehicle does not change.

2. Discussion of the Related Art

The performance of various vehicle control systems, such as collision avoidance systems, adaptive cruise control systems, automated lane-keeping systems, automated braking systems (ABS), traction control systems (TCS), stability control systems, etc., can be greatly improved by providing a reliable estimate of the maximum tire/road surface coefficient of friction. For example, the gains and the commanded values of the vehicle control system can be made adaptive to the maximum tire/road surface coefficient of friction to increase the performance of the system.

The wheel-slip of a vehicle wheel during acceleration is defined as the difference in wheel speed between a driven wheel and a non-driven wheel. The wheel-slip ratio is the ratio of the difference between the speeds of the driven wheel and the non-driven wheel to the speed of the driven wheel. It can be shown that the slope of the wheel-slip ratio road surface coefficient of friction curves for small slip ratios (in the linear region) is almost the same for all road surfaces.

It is typically difficult to classify the road surface condition when the wheel-slip ratio is in the linear operating region. As the wheel-slip ratio increases, the slope for the different road surface conditions starts to decrease and become different. However, once the vehicle is in the non-linear operating region, it may be too late for the control system to utilize the wheel slip information and adapt to the current road surface conditions. Therefore, it is desirable to estimate the maximum tire/road surface coefficient of friction before the wheel-slip ratio reaches the value that corresponds to the maximum coefficient of friction. By estimating the slope of the curve at higher wheel-slip ratios, it is possible to classify the road surfaces as, for example, icy, snowy, wet or dry.

United States Patent Application Publication No. 2007/0061061, assigned to the assignee of this application and herein incorporated by reference, discloses a method for classifying a road surface condition by estimating the maximum tire/road surface coefficient of friction for a vehicle that includes actively inducing an acceleration or deceleration of the vehicle. The induced acceleration/deceleration allows the speed of the wheels to be measured so that the tire/road surface coefficient of friction and the driven wheel-slip ratio can be calculated. The tire/road surface coefficient of friction and the wheel-slip ratio are then used to determine the slope of the wheel slip/coefficient of friction curve to classify the road surface condition.

Although the method of the '061 application is effective for classifying the road surface condition by determining the maximum tire/road surface coefficient of friction and the wheel-slip ratio, the acceleration or deceleration that is induced on the vehicle can be felt by the vehicle operator.

SUMMARY OF THE INVENTION

In accordance with the teachings of the present invention, a method for estimating the maximum tire/road surface coefficient of friction for a vehicle is disclosed that includes actively inducing a small amount of acceleration or deceleration to the front wheels or the rear wheels of the vehicle and inducing a corresponding and opposite amount of acceleration or deceleration to the other of the front wheels or the rear wheels of the vehicle so that the acceleration and deceleration cancel each other and the perceived speed of the vehicle does not change. The tire/road surface coefficient of friction and a wheel slip ratio can be used to determine the road surface condition.

Additional features of the present invention will become apparent from the following description and appended claims taken in conjunction with the accompanying drawings.

DETAILED DESCRIPTION OF THE EMBODIMENTS

The following discussion of the embodiments of the invention directed to a method for estimating the maximum tire/road surface coefficient of friction for a vehicle to classify a road surface condition by inducing an acceleration or deceleration to either the front wheels or the rear wheels of the vehicle and the opposite of the acceleration or deceleration to the other of the front wheels or the rear wheels of the vehicle is merely exemplary in nature, and is in no way intended to limit the invention or its applications or uses.

Figure 1:
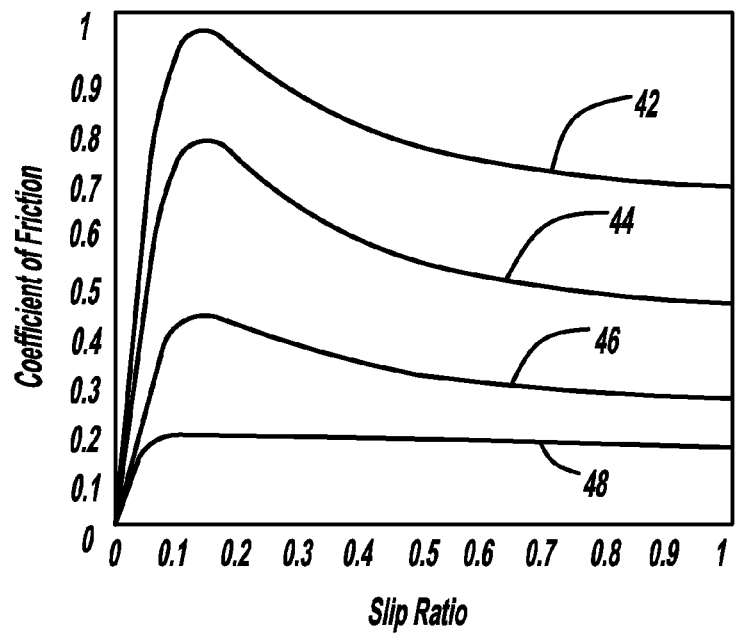
FIG. 1 is a graph with wheel-slip ratio on the horizontal axis and coefficient of friction on the vertical axis showing wheel-slip ratio curves for different road conditions, including an icy, snowy, wet and dry road condition.

FIG. 1 is a graph with wheel-slip ratio on the horizontal axis and coefficient of friction on the vertical axis showing wheel-slip curves for different road conditions. Graph line 42 is a wheel-slip ratio curve for a dry road condition, graph line 44 is a wheel-slip ratio curve for a wet road condition, graph line 46 is a wheel-slip ratio curve for a snowy road condition and graph line 48 is a wheel-slip ratio curve for an icy road condition.

The present invention includes a method for classifying road surface conditions, such as wet, icy, snowy or dry, by estimating the maximum tire/road surface coefficient of friction and the wheel-slip ratio for a vehicle. The method includes inducing an acceleration or deceleration to the front wheels or rear wheels of the vehicle and inducing the opposite acceleration or deceleration to the other of the front wheels and rear wheels of the vehicle so that the perceived vehicle speed does not change. The induced acceleration and deceleration are used to estimate the wheel-slip ratio and the tire/road surface coefficient of friction, which are then used to determine the slope of the wheel-slip ratio curve to classify the road condition. If the vehicle is equipped with telematics, it can calculate the road surface condition, and transmit it back to other vehicles approaching the area wirelessly.

Figure 2:
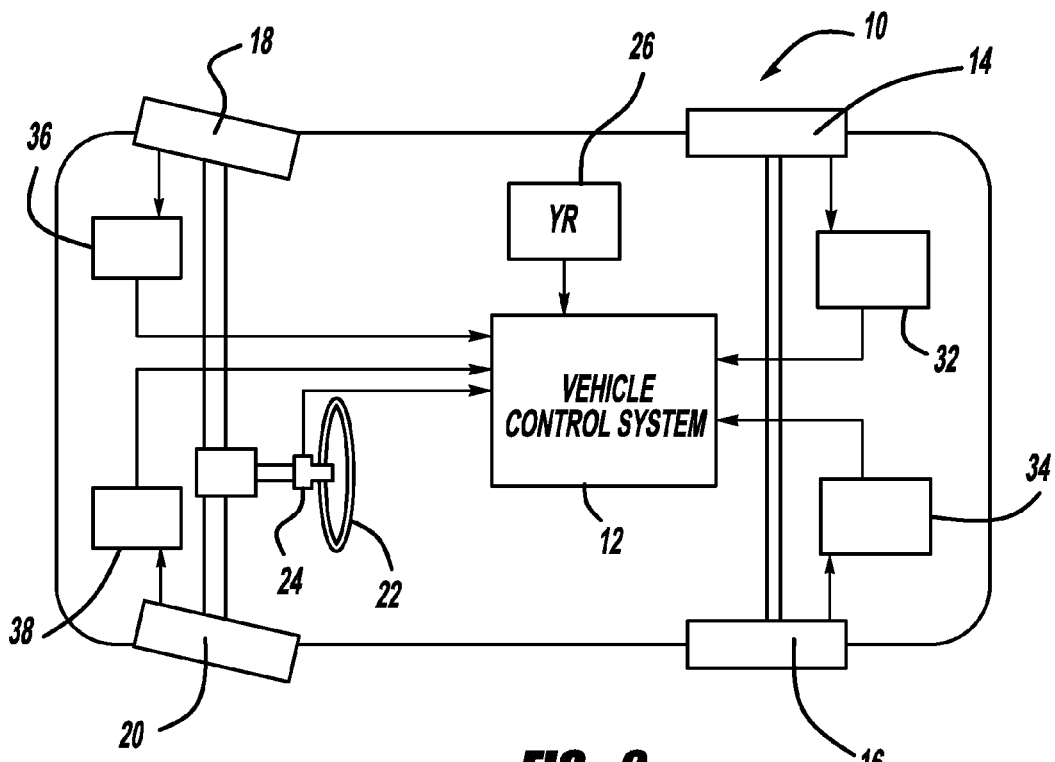
FIG. 2 is a plan view of a vehicle including a vehicle control system employing a method for estimating a maximum tire/road surface coefficient of friction.

FIG. 2 is a plan view of a vehicle 10 including a vehicle control system 12, such as a collision avoidance system, an adaptive cruise control system, an automated lane-keeping system, an automated braking system, a turning control system, a stability control system, etc. The vehicle 10 includes rear wheels 14 and 16 and front wheels 18 and 20. A hand-wheel 22 is used to steer the front wheels 18 and 20, and a hand-wheel angle sensor 24 measures the angle of the hand-wheel 22 to provide the road wheel angle. A yaw rate sensor 26 measures the yaw rate of the vehicle 10. Further, wheel speed sensors 32, 34, 36 and 38 measure the rotational speed of the wheels 14, 16, 18 and 20, respectively. The vehicle control system 12 receives signals from each of the hand-wheel angle sensor 24, the yaw rate sensor 26, and the wheel speed sensors 32, 34, 36 and 38 for reasons that will become apparent from the discussion below.

Figure 3:
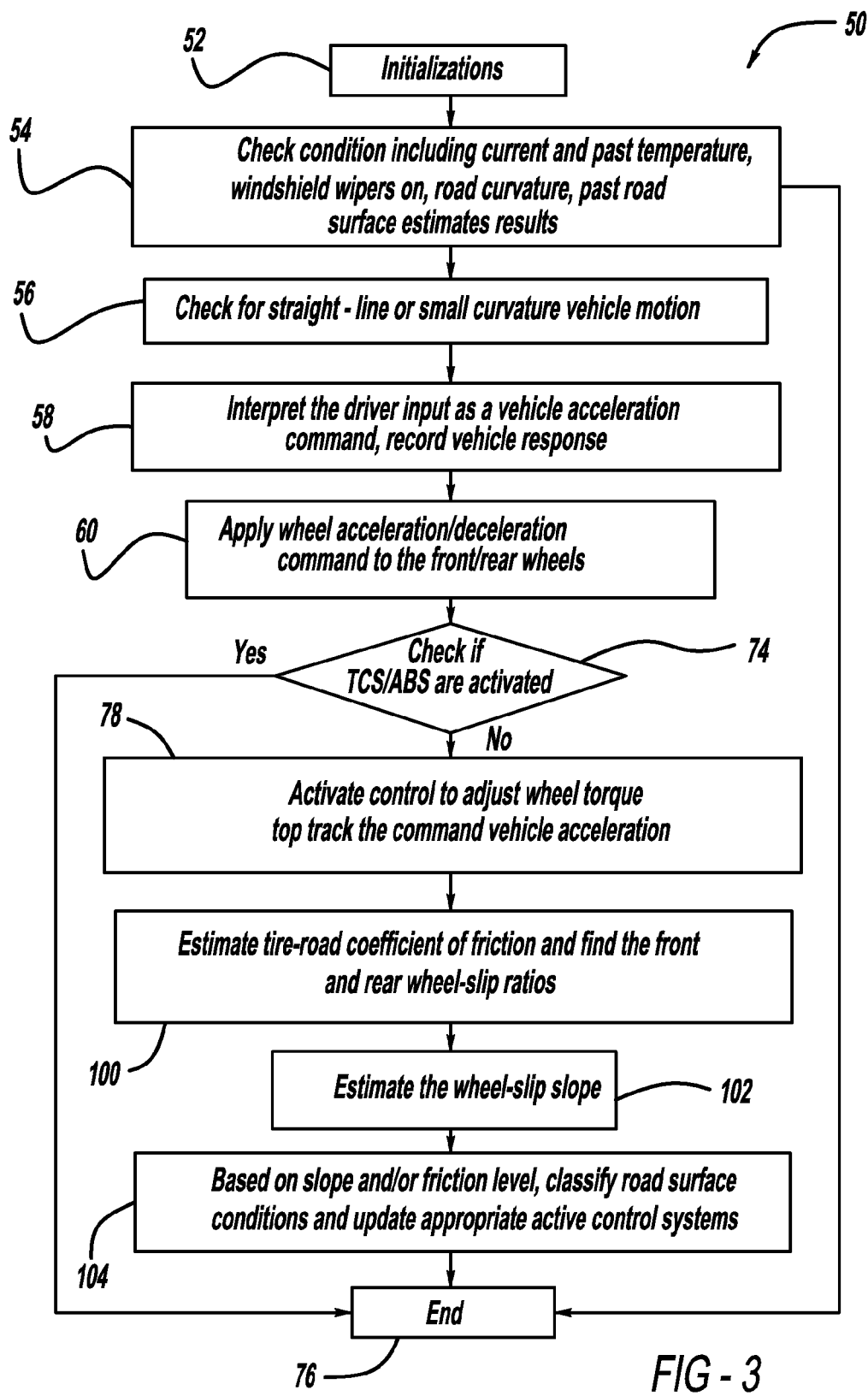
FIG. 3 is a flow chart diagram showing a method for determining a maximum tire/road surface coefficient of friction and road surface classification.

FIG. 3 is a flow chart diagram 50 showing a method for classifying the road surface condition by estimating maximum tire/road surface coefficient of friction and wheel-slip ratio, according to an embodiment of the present invention. The flow chart diagram 50 determines whether the road surface is icy or snowy. However, the same approach can be used for other road conditions, such as wet and dry road conditions. The algorithm is initialized at box 52, where time, counters and thresholds are defined.

Next, the algorithm determines whether the conditions are proper for estimating the tire/road surface coefficient of friction, and if so, how often it will be done at box 54. These conditions include, but are not limited to, measuring the outside ambient temperature, determining whether the windshield wipers are on, determining the proportion of time the road has been classified as icy or snowy, determining the past road surface condition, and previewing the road curvature. For example, it is not necessary to determine whether the road condition is icy or snowy if the ambient air temperature has been above freezing for a significant period of time. Also, it is desirable to determine whether the vehicle 10 will be traveling around a curve in the near future, where icy and snowy conditions may be more dangerous as determined at box 56. In one embodiment, the system 12 uses map databases and GPS information to anticipate whether the vehicle 10 will be traveling around a significant turn in the near future so that this information can be used in the calculation process.

The algorithm then determines whether the driver has made a vehicle acceleration command at box 58, and if so, records the vehicle response to calculate the tire/road coefficient of friction as described herein. At box 60, the algorithm applies a wheel acceleration or deceleration command to the front wheels 18 and 20 and the rear wheels 14 and 16 of the vehicle 10. If an acceleration torque is induced on the rear wheels 14 and 16 to increase the speed of the rear wheels 14 and 16, then a corresponding braking torque is applied to the front wheels 18 and 20 so that the speed of the vehicle 10 does not change. Likewise, if the vehicle 10 is a front wheel drive vehicle and an acceleration torque is induced to the front wheels 18 and 20 of the vehicle 10, then a corresponding deceleration torque is applied to the rear wheels 14 and 16. If the vehicle 10 is an all wheel drive vehicle, then the appropriate corresponding acceleration and deceleration torque is provided to the front wheels 18 and 20 and the rear wheels 14 and 16, as discussed herein.

A controlled amount of torque $T_{in}$ to induce wheel acceleration/deceleration is applied to one axle of the vehicle 10 under certain conditions with a certain frequency. A coordinated amount of torque $T_{in}$ is applied to the other axle so as to maintain vehicle acceleration or deceleration to be within the driver's desired level, and hence no adverse impact on the vehicle driver. The resulting wheel-slips are measured from the front wheels 18 and 20 and the rear wheels 14 and 16. The front and rear wheel-slips $s_f$ and $s_r$, respectively of the vehicle 10 are defined as:

$$s_f = (\omega_f r_f - v)/v \qquad (1)$$

$$s_r = (\omega_r r_r - v)/v \qquad (2)$$

Where $s_f$ is the wheel-slip of the front wheels 18 and 20, $s_r$ is the wheel-slip of the rear wheels 14 and 16, $\omega_f$ is the wheel speed of the front wheels 18 and 20, $\omega_r$ is the wheel speed of the rear wheels 14 and 16, $r_f$ is the radius of the front wheels 18 and 20, $r_r$ is the radius of the rear wheels 14 and 16 and v is the vehicle speed.

The wheel acceleration or deceleration behavior for the front wheels 18 and 20, where the acceleration or deceleration behavior for the rear wheels 14 and 16 could be described in the same manner, can be described as:

$$\alpha_f = (T_{in,f} - T_{b,f} - \mu_f N_f r_f)/I_f \qquad (3)$$

Where $\alpha_f$ is the wheel speed command for the front wheels 18 and 20, $T_{in,f}$ is the torque applied to the front wheels 18 and 20, $\mu_f$ is the tire/road surface coefficient of friction at the front wheels 18 and 20, $N_f$ is the normal force at the front wheels 18 and 20 and $I_f$ is the front wheel intertia.

Figure 4:
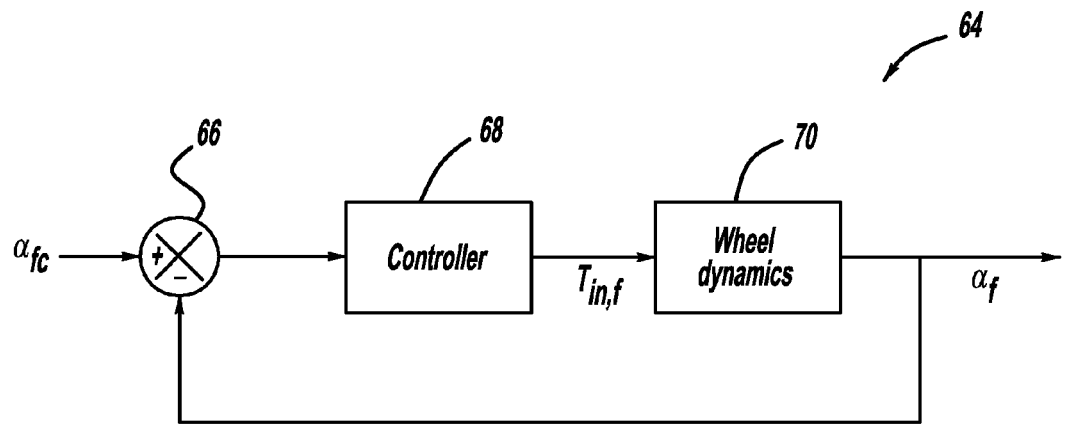
FIG. 4 is a block diagram of a closed-loop system for inducing an acceleration or deceleration to vehicle wheels.

In one embodiment, the deceleration and acceleration applied to the front wheels 18 and 20 and the rear wheels 14 and 16 for the vehicle 10 can be based on closed-loop control. In this manner, the front or rear wheel acceleration or deceleration can be controlled to follow a certain command for a specific amount of time. FIG. 4 is a block diagram of a system 64 that can provide this closed-loop control for the front wheels 18 and 20. The system 64 employs a feedback adder 66 that receives a driver front wheel acceleration command signal $\alpha_{fc}$ and an actual wheel acceleration signal $\alpha_f$ at the output of the system 64 that generates an error signal. The error signal is provided to a controller 66 that changes the acceleration or deceleration torque command $T_{in,f}$ to reduce the error signal. The front wheel torque command $T_{in,f}$ is provided to wheel dynamics 70 that represents the front wheels 18 and 20 of the vehicle 10 for acceleration and deceleration to generate the actual wheel acceleration signal $\alpha_f$. The acceleration or deceleration signal for the rear wheels 14 and 16 can be determined in the same manner.

Figure 5:
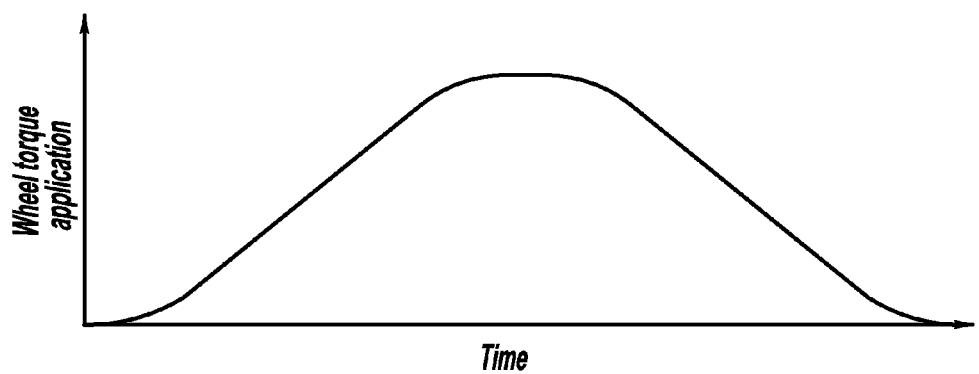
FIG. 5 is a graph with time on the horizontal axis and wheel torque application on the vertical axis showing inducing of acceleration or deceleration to the wheels of the vehicle over time for an open-loop system.

In an alternate embodiment, the deceleration and acceleration command signal α applied to the front wheels 18 and 20 and the rear wheels 14 and 16 for the vehicle 10 can be based on open-loop control. FIG. 5 is a graph with time on the horizontal axis and wheel torque application on the vertical axis showing inducing acceleration or deceleration to the wheels of the vehicle 10 over time. The rate of change of the torque should be designed so as to assure a proper transient, such as a jerk less than 0.05 g/sec, for the total vehicle control.

Returning to FIG. 3, once the system 64 has applied the acceleration and deceleration command signals to the front wheels 18 and 20 and the rear wheels 14 and 16 of the vehicle 10 at the box 60, the algorithm determines whether a traction control system (TCS) or an automatic braking system (ABS) on the vehicle 10 has been activated at decision diamond 24, indicating that the vehicle 10 is currently on an icy or snowy road and under stability control. If the TCS is activated, then the road surface condition can be classified based on TCS activation information, and there is no need to continue with the estimation process of the invention. If such an occurrence has happened, then the vehicle 10 will already know what the road condition is so that the tire/road surface coefficient friction does not need to be calculated. Thus, the algorithm will go to end box 76.

If the TCS or ABS has not been activated at the decision diamond 74, then the algorithm activates a control to adjust the wheel torque to track the commanded vehicle acceleration at box 78. At this step of the process, the front wheel and the rear wheel acceleration is controlled to keep the vehicle acceleration unchanged from the drivers command.

The vehicle acceleration command signal a can be defined as:

$$a = (\mu_f N_f + \mu_r N_r - F_a - F_{r,f} - F_{r,r} - F_g)/m \quad (4)$$

Where $F_a$ is the acceleration force, $F_{r,f}$ is the wind resistance force at the front wheels 18 and 20, $F_{r,r}$ is the wind resistance force at the rear wheels 14 and 16, $F_g$ is the force of gravity as a result of road incline and m is the mass of the vehicle 10.

From a vehicle free-body diagram, the normal forces $N_F$ and $N_r$ at the front wheels 18 and 20 and the rear wheels 14 and 16, respectively, of the vehicle 10 can be calculated as:

$$N_F = (mgb - ma_x h)/L \quad (5)$$

$$N_r = (mga - ma_x h)/L \quad (6)$$

Where g is the gravitational constant, b is the distance between a center of gravity of the vehicle 10 and the rear wheels 14 and 16, a is the distance between a center of gravity of the vehicle 10 and the front wheels 14 and 16, h is the distance between the center of gravity of the vehicle 10 and the road surface and L is the wheel base of the vehicle 10.

Figure 6:
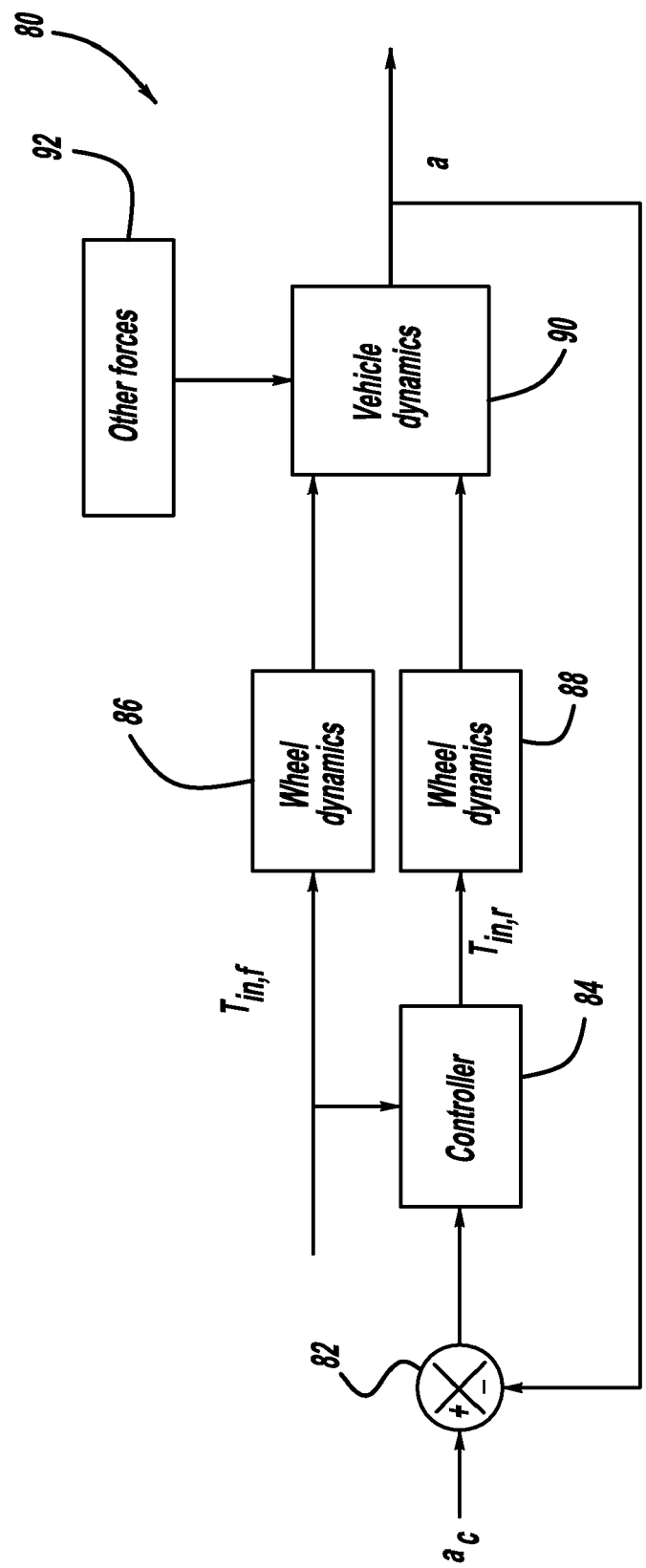
FIG. 6 is a block diagram of a system for providing a vehicle acceleration command for the system of the invention.

Based on this information, the vehicle acceleration command signal a can be controlled by adjusting the front wheel and rear wheel torque $T_{in}$ using a system 80 shown in FIG. 6. The driver vehicle acceleration command signal $a_c$ and the vehicle acceleration command signal a that controls the acceleration of the vehicle 10 are applied to a comparator 82 that generates an error signal of the difference therebetween that is sent to a controller 84. The controller 84 receives a torque command signal $T_{in,f}$ for the front wheels 16 and 18 of the vehicle 10 and generates a corresponding torque command signal $T_{in,r}$ for the rear wheels 14 and 16 of the vehicle 10.

In this embodiment, the rear wheels 14 and 16 are the driven wheels where the deceleration will be applied to the front wheels 18 and 20 of the vehicle 10. The torque command signal $T_{in,f}$ for the front wheels 18 and 20 is applied to a wheel dynamics box 86 that defines the wheel dynamics of the front wheels 18 and 20 and the torque command signal $T_{in,r}$ for the rear wheels 14 and 16 is applied to a wheel dynamics box 88 that defines the dynamics of the rear wheels 14 and 16 of the vehicle 10. Front wheel and rear wheel friction forces from the wheel dynamics boxes 86 and 88 are then sent to a vehicle dynamics box 90 along with the other forces at box 92, referred to above in equation (4), that determine the acceleration command signal a per equation (4).

The controller 84 can determine the torque command signal $T_{in,r}$ in any desirable manner. In one embodiment, the controller 84 has a feed-forward part and a feedback proportional and integral part. The feed-forward gain should be adjusted to keep the acceleration commanded by the driver unchanged in an open-loop fashion. The feed-forward gain can also be made so that it adapts to and learns the vehicle parameter changes. Any mismatch between the front and rear torques can be compensated by a proportional/integral (PI) gain, or any equivalent control. The acceleration jerk should be less than 0.05 g/sec by calibration of the feedback gains and the proper adjustment of the front axle torque. Based on this analysis, the controller 84 can calculate the front torque command signal $T_{in,r}$ as:

$$T_{in,r} = K_0 T_{in,f} + K_1(a_c - a) + K_2 \int (a_c - a) dt \quad (7)$$

Where $K_0$ is an arbitrary calibration constant, $K_1$ is the proportional gain and $K_2$ is the integral gain.

Returning to FIG. 3, the algorithm then estimates the tire/road coefficient of friction μ and finds the front and rear wheel-slip ratios at box 100. The front and rear wheel-slip ratios can be obtained from the wheel-slips $s_f$ and $s_r$ in equations (1) and (2). In one example, the front and rear tire-road coefficient of friction $\mu_f$ and $\mu_r$, respectively, can be calculated as:

$$\mu_f = (-\alpha_f \bar{J}_f + T_{in,f})/N_f r_f \quad (8)$$

$$\mu_r = (-\alpha_r \bar{J}_r + T_{in,r})/N_r r_r \quad (9)$$

The slope k of the wheel-slip ratio is estimated at box 102 using any suitable known estimation method, such as least squares estimation or Kalman filtering estimations. Based on the slope and/or coefficient of friction level, the road surface condition is classified and updated for the vehicle control system 12 at box 104. In one embodiment, the slope of the friction slip curve can be estimated as:

$$s_f = \frac{1}{k_f} \mu_f + \delta_f \quad (10)$$

$$s_r = \frac{1}{k_r} \mu_r + \delta_r \quad (11)$$

Where $k_f$ and $k_r$ are the slope of the friction slip curves at the front and rear of the vehicle 10, respectively, and $\delta_f$ and $\delta_r$ are front and rear calibration offset constants, respectively. The process then ends at the box 76.

Figure 7:
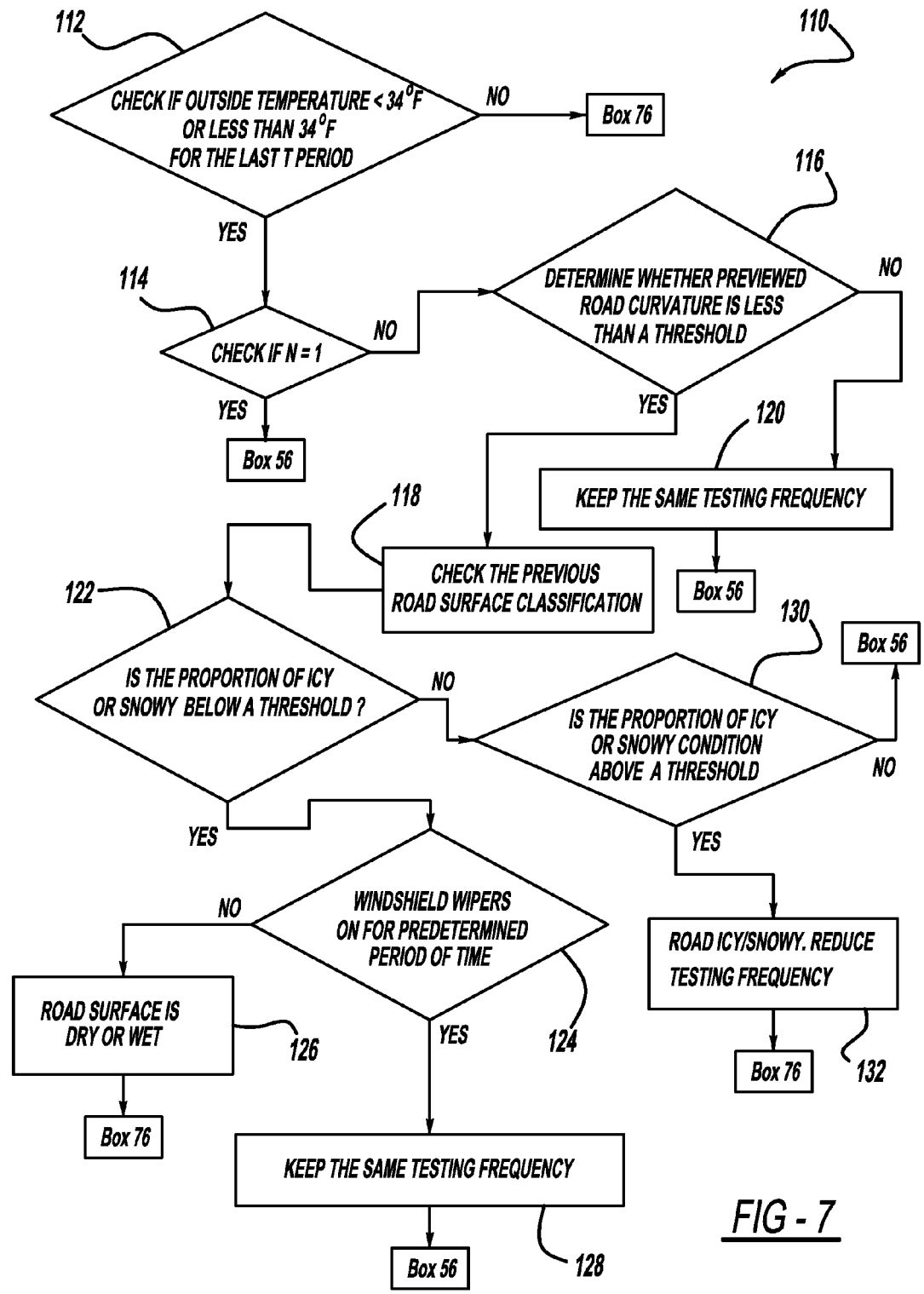
FIG. 7 is a flow chart diagram showing a process for determining a vehicle road surface condition.

FIG. 7 is a flow chart diagram 110 showing a detailed discussion of checking the vehicle conditions to determine if the road surface will be classified, and if so, how often at the box 54. The algorithm determines whether the outside air temperature is less than 34° F., or is higher than 34° F., but for less than time T, at box 112. The value 34° F. is by way of a non-limiting example in that other systems may use other temperatures. If the outside temperature is not less than 34° F. and has been greater than 34° F. for longer than time period T, then the algorithm goes to the end box 76 because the road surface condition determination is not necessary because the temperature is too warm for icy or snowy road conditions.

If the air temperature is less than 34° F. or it is higher than 34° F., but not for a long enough time period, then the algorithm determines whether it is the first calculation period N (start-up) at decision diamond 114. If N is equal to 1 at the decision diamond 114 indicating the first calculation period, then the algorithm goes directly to the box 56. If N is not equal to 1, then the algorithm determines whether a previewed road curvature is less than a predetermined threshold at box 116. As discussed above, the process for determining the estimated tire/road surface coefficient of friction is not performed if the curvature of the road is greater than a predetermined value. That value can be any value suitable for a particular vehicle consistent within discussion herein. If the previewed road curvature is not less than the predetermined threshold, then the algorithm keeps the same testing frequency for classifying the road surface condition at box 120 and goes to the box 56. If the road curvature is less than the predetermined threshold, the previous classification of the road is checked at box 118.

The algorithm then determines if the proportion of time that the road surface has been classified as icy or snowy is less than a predetermined threshold at decision diamond 122. If the proportion of time that the road surface has been classified as icy or snowy is less than the predetermined threshold, than the algorithm knows that there is not much ice or snow on the road, if any. If the proportion is below the threshold at the decision diamond 122, then the algorithm determines whether the windshield wipers have been on for a predetermined period of time at decision diamond 124. If the windshield wipers have not been on for the predetermined period of time at the decision diamond 124, then the algorithm determines that the road surface is dry or wet at box 126, and ends at the box 76. If the windshield wipers have been on for the predetermined period of time, then the algorithm keeps the same testing frequency at box 128 and then goes to the box 56.

If the proportion of icy or snow conditions is above the threshold at the decision diamond 122, where some ice or snow is present, then the algorithm determines if the proportion of icy or snow conditions is above a predetermined threshold at decision diamond 130. If the proportion of icy or snowy road conditions is not above the threshold at the decision diamond 130, then the algorithm goes to the box 56. Otherwise, the algorithm reduces the testing frequency at box 132 and ends at the box 76 because the algorithm already knows that the road is icy or snowy.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining a road surface condition for a vehicle, said method comprising:
    determining a plurality of vehicle operating parameters;
    determining whether the vehicle is traveling along a substantially straight line or along a curve;
    increasing or decreasing the speed of one of front wheels or rear wheels of the vehicle for a predetermined period of time;
    increasing or decreasing the other of the front wheels or the rear wheels of the vehicle a corresponding and opposite amount so that the speed of the vehicle does not change;
    determining a tire/road surface coefficient of friction based on the change in the speed of the wheels of the vehicle;
    determining a wheel-slip ratio from the change in the speed of the wheels of the vehicle; and
    determining the road surface condition based on the tire/road surface coefficient of friction and the wheel-slip ratio.

2. The method according to claim 1 wherein determining the road surface condition includes calculating a slope of a curve that defines a function between the tire/road surface coefficient of friction and the wheel-slip ratio.

3. The method according to claim 2 wherein determining the tire/road surface coefficient of friction and the wheel-slip ratio includes using the speed of wheels of the vehicle.

4. The method according to claim 3 wherein determining the tire/road surface coefficient of friction, determining the wheel-slip ratio and determining the slope of the curve includes using the equations:

$$s = (\omega r - v)/v$$
$$\mu = (-\alpha \bar{I} + T_{in})/Nr$$
$$s = \frac{1}{k}\mu + \delta$$

where $\omega$ is the speed of the wheels of the vehicle, v is the speed of the vehicle, r is the radius of the wheels, s is the wheel-slip ratio, $\mu$ is the tire/road surface coefficient of friction, $T_{in}$ is the torque applied to the wheels, N is a normal force at the wheels, k is the slope and $\delta$ is a constant.

5. The method according to claim 1 wherein increasing or decreasing the speed of the front wheels or the rear wheels includes using open-loop control.

6. The method according to claim 1 wherein increasing or decreasing the speed of the front wheels or the rear wheels of the vehicle includes using closed-loop control that attempts to reduce an error signal between a driver acceleration command signal and a wheel speed command signal.

7. The method according to claim 6 wherein the error signal is applied to an acceleration controller that controls wheel torque.

8. The method according to claim 1 wherein increasing or decreasing the speed of the front wheels or the rear wheels includes actively controlling wheel torque to follow a commanded vehicle acceleration.

9. The method according to claim 8 wherein actively controlling the wheel torque includes comparing a wheel acceleration to a driver acceleration command to generate an error signal therebetween and providing a torque signal for reducing the error signal.

10. The method according to claim 1 further comprising determining whether a traction control system or an automatic braking system on the vehicle is activated, and if so, suspending the operation for determining the road surface condition.

11. A method for determining a road surface condition for a vehicle system, said method comprising:
    increasing or decreasing the speed of one of front wheels or rear wheels of the vehicle for a predetermined period of time;
    increasing or decreasing the other of the front wheels or the rear wheels of the vehicle a corresponding and opposite amount so that the speed of the vehicle does not change;
    determining a tire/road surface coefficient of friction using the change in the speed of the wheels of the vehicle;
    determining a wheel-slip ratio of the wheels of the vehicle using the change in speed of the wheels of the vehicle; and
    determining a slope of a curve that defines a function of the tire/road surface coefficient of friction and the wheel-slip ratio to determine the road surface condition.

12. The method according to claim 11 wherein increasing or decreasing the speed of the front wheels or the rear wheels includes using open-loop control.

13. The method according to claim 11 wherein increasing or decreasing the speed of the front wheels or the rear wheels of the vehicle includes using closed-loop control that attempts to reduce an error signal between a driver acceleration command signal and a wheel speed command signal.

14. The method according to claim 13 wherein the error signal is applied to an acceleration controller that controls wheel torque.

15. The method according to claim 11 wherein increasing or decreasing the speed of the front wheels or the rear wheels includes actively controlling wheel torque to follow a commanded vehicle acceleration.

16. The method according to claim 15 wherein actively controlling the wheel torque includes comparing a wheel acceleration to a driver acceleration command to generate an error signal therebetween and providing a torque signal for reducing the error signal.

17. A method for determining a maximum tire/road surface coefficient of friction for a vehicle, said method comprising:
increasing or decreasing the speed of one of front wheels or rear wheels of the vehicle for a predetermined period of time;
increasing or decreasing the other of the front wheels or the rear wheels of the vehicle a corresponding and opposite amount so that the speed of the vehicle does not change; and
determining the maximum tire/road surface coefficient of friction based on the change in the speed of the wheels of the vehicle.

18. The method according to claim 17 wherein increasing or decreasing the speed of the front wheels or the rear wheels includes using open-loop control.

19. The method according to claim 17 wherein increasing or decreasing the speed of the front wheels or the rear wheels includes using closed-loop control that attempts to reduce an error signal between a driver acceleration command signal and a wheel speed command signal.

20. The method according to claim 17 wherein increasing or decreasing the speed of the front wheels or the rear wheels includes actively controlling wheel torque to follow a commanded vehicle acceleration.

* * * * *